United States Patent
Park

(10) Patent No.: US 11,038,831 B2
(45) Date of Patent: Jun. 15, 2021

(54) NOTIFICATION METHOD OF MOBILE TERMINAL USING A PLURALITY OF NOTIFICATION MODES AND MOBILE TERMINAL USING THE METHOD

(71) Applicant: KAKAO CORP., Seongnam-si (KR)

(72) Inventor: Ki Sun Park, Seoul (KR)

(73) Assignee: KAKAO CORP., Gyeonggi-do (KR)

( * ) Notice: Subject to any disclaimer, the term of this patent is extended or adjusted under 35 U.S.C. 154(b) by 717 days.

(21) Appl. No.: 14/398,895

(22) PCT Filed: May 8, 2013

(86) PCT No.: PCT/KR2013/003991
§ 371 (c)(1),
(2) Date: Nov. 4, 2014

(87) PCT Pub. No.: WO2013/168987
PCT Pub. Date: Nov. 14, 2013

(65) Prior Publication Data
US 2015/0134755 A1    May 14, 2015

(30) Foreign Application Priority Data

May 8, 2012 (KR) .......................... 10-2012-0048526

(51) Int. Cl.
*H04L 12/58* (2006.01)
*H04W 4/12* (2009.01)
*H04L 12/18* (2006.01)

(52) U.S. Cl.
CPC .......... *H04L 51/24* (2013.01); *H04L 12/1859* (2013.01); *H04L 51/32* (2013.01); *H04W 4/12* (2013.01)

(58) Field of Classification Search
CPC ..... H04L 51/24; H04L 12/1859; H04L 51/32; H04W 4/12
See application file for complete search history.

(56) References Cited

U.S. PATENT DOCUMENTS 6,937,225 B1 * 8/2005 Kehlstadt ................ G06F 3/016
340/7.58
7,224,960 B2 * 5/2007 Giacalone ............... H04L 29/06
455/410
(Continued)

FOREIGN PATENT DOCUMENTS

EP       1872257 A1 * 1/2008 ............. H04L 67/26
JP     H11-243439 A     9/1999
(Continued)

OTHER PUBLICATIONS

Google search history to show dates of citiations (Year: 2020).*
(Continued)

*Primary Examiner* — Uzma Alam
(74) *Attorney, Agent, or Firm* — Marshall, Gerstein & Borun LLP

(57) ABSTRACT

Disclosed is a notification method of a mobile terminal using a plurality of notification modes. A mobile terminal according to one aspect of the present invention determines a first configuration type relating to the notification mode of the mobile terminal in response to the receipt of a new push message. The mobile terminal determines a second configuration type relating to the notification mode of a push message application based on the first configuration type. The mobile terminal notifies the arrival of a new push message according to the second configuration type. That is, embodiments may provide a technology that uses at least two configurations relating to the notification mode of the mobile terminal so as to notify the user about receipt of a new message.

2 Claims, 16 Drawing Sheets

(56) References Cited

U.S. PATENT DOCUMENTS

| | | | | |
|---|---|---|---|---|
| 7,353,047 | B2* | 4/2008 | Boyd | H04M 1/72566 379/164 |
| 7,769,039 | B2* | 8/2010 | Oral | G06Q 10/10 370/429 |
| 7,827,228 | B2* | 11/2010 | Emberton | G06Q 10/10 709/201 |
| 8,108,832 | B2* | 1/2012 | Etelapera | G06F 8/65 717/107 |
| 8,180,406 | B2* | 5/2012 | Lim | H04M 3/4234 340/7.58 |
| 8,286,095 | B2* | 10/2012 | Vymenets | G06F 3/04847 715/810 |
| 8,311,521 | B1* | 11/2012 | Paczkowski | H04W 8/18 455/414.1 |
| 8,576,828 | B1* | 11/2013 | Massey, Jr. | H04M 3/02 370/349 |
| 8,615,224 | B2* | 12/2013 | Ericson, IV | H04M 1/72451 455/418 |
| 8,768,494 | B1* | 7/2014 | Stroud | H04S 7/30 700/94 |
| 8,775,948 | B2* | 7/2014 | Ark | G06Q 10/10 715/753 |
| 8,825,092 | B2* | 9/2014 | Sennett | H04W 4/90 455/466 |
| 8,843,103 | B2* | 9/2014 | Daly | H04W 4/90 455/404.1 |
| 8,875,042 | B2* | 10/2014 | Lejeune | G06F 1/1616 715/764 |
| 8,886,211 | B2* | 11/2014 | Paulson | H04M 19/04 455/414.1 |
| 8,954,100 | B2* | 2/2015 | Toksvig | G06Q 50/01 455/466 |
| 9,075,507 | B2* | 7/2015 | Dempski | G06F 3/04817 |
| 9,147,085 | B2* | 9/2015 | Bender | G06F 21/629 |
| 9,183,534 | B2* | 11/2015 | Gharabally | G06Q 10/10 |
| 9,280,377 | B2* | 3/2016 | Lang | G06F 9/4555 |
| 9,348,607 | B2* | 5/2016 | Chaudhri | H04M 1/72577 |
| 9,350,851 | B1* | 5/2016 | Halls | H04M 1/72536 |
| 9,392,438 | B2* | 7/2016 | Stanke | H04W 8/18 |
| 9,406,051 | B2* | 8/2016 | Honda | G06Q 10/109 |
| 9,467,474 | B2* | 10/2016 | Barton | G06F 9/45533 |
| 9,584,992 | B2* | 2/2017 | Papakipos | H04W 4/21 |
| 9,985,850 | B2* | 5/2018 | Qureshi | H04L 43/04 |
| 10,171,391 | B2* | 1/2019 | Phanshikar | H04L 51/26 |
| 10,373,713 | B1* | 8/2019 | Kello | G16H 40/20 |
| 2005/0150359 | A1* | 7/2005 | Huang | G09B 15/003 84/602 |
| 2005/0164746 | A1* | 7/2005 | Boyd | H04M 1/72566 455/567 |
| 2006/0078105 | A1* | 4/2006 | Korn | H04M 1/663 379/210.02 |
| 2007/0021108 | A1* | 1/2007 | Booking | H04M 1/72563 455/414.1 |
| 2007/0055770 | A1* | 3/2007 | Karmakar | H04L 67/26 709/224 |
| 2007/0121920 | A1* | 5/2007 | Silver | H04M 1/663 379/376.02 |
| 2008/0159522 | A1* | 7/2008 | Ericson | H04M 19/04 379/373.02 |
| 2008/0165022 | A1* | 7/2008 | Herz | G06F 3/038 340/669 |
| 2008/0207263 | A1* | 8/2008 | May | H04M 19/04 455/556.2 |
| 2008/0255919 | A1* | 10/2008 | Gorder | G06Q 10/109 705/7.13 |
| 2009/0181646 | A1* | 7/2009 | Bouazizi | H04N 21/41407 455/412.2 |
| 2010/0088692 | A1* | 4/2010 | Rathi | G06F 8/65 717/171 |
| 2010/0227600 | A1* | 9/2010 | Vander Veen | H04M 19/04 455/418 |
| 2010/0311336 | A1* | 12/2010 | Huotari | H04M 1/72572 455/41.3 |
| 2011/0116616 | A1 | 5/2011 | Selph et al. | |
| 2011/0196520 | A1* | 8/2011 | Peterson | G06F 3/165 700/94 |
| 2011/0199214 | A1* | 8/2011 | Gawlick | A61B 5/0008 340/573.1 |
| 2011/0200206 | A1* | 8/2011 | Ruwisch | H04R 3/005 381/92 |
| 2012/0002848 | A1* | 1/2012 | Hill | A61B 5/167 382/118 |
| 2012/0120105 | A1* | 5/2012 | Honda | G06Q 10/109 345/634 |
| 2012/0173645 | A1* | 7/2012 | Marcellino | H04L 51/24 709/206 |
| 2012/0280917 | A1* | 11/2012 | Toksvig | G06F 1/1626 345/173 |
| 2012/0290508 | A1* | 11/2012 | Bist | G06F 16/437 706/10 |
| 2013/0101140 | A1* | 4/2013 | Cho | H03G 3/10 381/109 |
| 2013/0339513 | A1* | 12/2013 | Zhang | H04M 1/72519 709/223 |
| 2016/0042648 | A1* | 2/2016 | Kothuri | A63F 13/213 434/236 |
| 2020/0342979 | A1* | 10/2020 | Sadowsky | A61B 5/0077 |

FOREIGN PATENT DOCUMENTS

| | | | | |
|---|---|---|---|---|
| JP | 2003-338855 A | | 11/2003 | |
| JP | 2004-236250 A | | 8/2004 | |
| JP | 2006-217284 A | | 8/2006 | |
| JP | 2009-005293 A | | 1/2009 | |
| JP | 2009-151577 A | | 7/2009 | |
| JP | 2010-087600 A | | 4/2010 | |
| KR | 2002-0073688 A | | 9/2002 | |
| KR | 2006-0078834 A | | 7/2006 | |
| KR | 2007-0056861 A | | 6/2007 | |
| KR | 2007-0073256 A | | 7/2007 | |
| KR | 20070095202 A | * | 9/2007 | ......... H04L 65/1096 |
| WO | WO-2004004295 A1 | * | 1/2004 | ........ H04M 1/72451 |
| WO | WO 2004004295 A1 | * | 1/2004 | ........ H04M 1/72566 |
| WO | WO-2011141624 A1 | * | 11/2011 | ............ H04L 51/24 |

OTHER PUBLICATIONS

Verizon Wirless Manage Do not Disturb Settings—Brigadier by Kyocera, Mar. 1, 2009 (Year: 2009).*

Zapek I'm sleeping App description Jun. 13, 2012 (Year: 2012).*

AppBrain—I'm sleeping App description and release dates Apr. 11, 2012 (Year: 2012).*

Blackberry—how to customize "in-holster" call, alert settings. Al Sacco. Feb. 14, 2011 (Year: 2011).*

Instruction Manual for REGZA Phone T-01C, produced by NTT Docomo Company, 2010.

Office Action for Japanese Patent Application No. 2015-511360, dated Aug. 2, 2016.

English-language translation of the non-patent literature document cited in the office action issued in Japanese Patent Application No. 2015-511360 dated Nov. 4, 2015.

Office Action issued in Japanese Patent Application No. 2015-511360, dated Nov. 4, 2015.

International Search Report issued in PCT/KR2013/003991 dated Jul. 18, 2013.

* cited by examiner

NOTIFICATION METHOD OF MOBILE TERMINAL USING A PLURALITY OF NOTIFICATION MODES AND MOBILE TERMINAL USING THE METHOD

CROSS-REFERENCE TO RELATED APPLICATIONS

The present application is the U.S. National Phase of PCT/KR2013/003991, filed on May 8, 2013, which claims the benefit of priority of Korean Patent Application No. 10-2012-0048526, filed May 8, 2012, the entire disclosures of which are hereby incorporated by reference herein.

TECHNICAL FIELD

The present invention relates to a notification method of a mobile terminal using a plurality of notification modes, a notification method of a portable terminal using a notification mode set among a plurality of notification modes, and a mobile terminal in which an application using a plurality of notification modes is installed.

BACKGROUND ART

Types of software, for example, an application, have been rapidly diversified as hardware performance in a mobile terminal is improving and functions supported by the mobile terminal are increasing.

Among various the types of software, an instant message service is one of numerous services most rapidly developed from portability of the mobile terminal. The instant message service supports an instant or real-time texting communication between at least two people using a network such as the Internet. An instant message application, or an instant messenger, is a client that relays an instant message. The instant message service differs from an electronic mail service in that a conversation occurs in real time. In the instant message service, transmission is performed immediately after each conversation participant inputs text, for example, a single-line message. Thus, using the instant message service is considered similar to a telephone conversation rather than an exchange of mail.

Among the numerous services, a social networking service (SNS) allows a user to establish a relationship with other unspecified users online. Thus, the user may build a new personal connection or solidify an existing personal connection.

A variety of applications including, for example, the instant message application and the SNS application, may inform a user of receipt of a new push notification when the applications receive such a notification. Here, the push notification refers to a message transmitted from a server using a push method. The push method refers to an information transmission method in which a transmission request on the Internet is initiated by the server. Thus, the push method is in contrast to a pull method in which a request for transmission of information is initiated by a client.

DISCLOSURE OF INVENTION

Technical Goals

An aspect of the present invention provides technology that uses at least two configurations associated with a notification mode of a mobile terminal to provide notification on receipt of a new message to a user.

In detail, the technology may preferentially follow a type of a first configuration with a higher priority based on a predetermined priority order, for example, the first configuration having a priority over a second configuration.

Further, the technology may simultaneously control all notification modes of applications installed in a mobile terminal based on a first configuration with a higher priority.

When the type of the first configuration corresponds to a predetermined type, for example, a ringtone mode, the technology may provide notification on an arrival of a new push message to a user based on the second configuration with a lower priority.

Concisely, under a limited condition dependent on the type of the first configuration, the technology may independently control each notification mode of the applications using the second configuration with the lower priority.

Technical Solutions

According to an aspect of the present invention, there is provided a notification method of a mobile terminal using a plurality of notification modes, the notification method including receiving a new push message from a server using an application installed in the mobile terminal, determining a type of a first configuration in response to reception of the new push message, determining a type of a second configuration based on the type of the first configuration, and providing notification on an arrival of the new push message based on the type of the second configuration. Here, the first configuration may include information associated with a notification mode of the mobile terminal, and the second configuration may include information associated with a notification mode of the application.

The notification modes may include at least one of at least one ringtone mode, at least one vibration mode, a silent mode, and a notification-off mode.

The determining of the type of the second configuration may be performed based on a determination that the type of the first configuration is a ringtone mode.

The notification method may further include providing notification on the arrival of the new push message based on the type of the first configuration in response to a determination that the type of the first configuration is a vibration mode or a silent mode.

The notification method may further include determining a third configuration based on the type of the first configuration. Here, the third configuration may include information associated with a predetermined time section. The determining of the type of the second configuration may be performed based on the type of the first configuration and a result of determining the third configuration.

The notification method may further include providing notification on the arrival of the new push message based on the type of the first configuration in response to a determination that a current time does not belong to the predetermined time section.

According to another aspect of the present invention, there is provided a notification method of a portable terminal using a notification mode set among a plurality of notification modes, the notification method including referring to a basic configuration table including a basic notification mode, obtaining an application notification mode from an application configuration table based on the basic notification mode, setting the notification mode to be the application notification mode, and operating a notification device corresponding to the notification mode.

The basic notification mode and the application notification mode may include at least one of at least one ringtone mode, at least one vibration mode, a silent mode, and a notification-off mode.

The obtaining of the application notification mode may be performed when the basic notification mode is a ringtone mode.

The notification method may further include setting the notification mode to be the basic notification mode when the basic notification mode is a vibration mode or a silent mode.

The notification method may further include obtaining a plurality of predetermined time sections from the application configuration table based on the basic notification mode. Here, each of the predetermined time sections may correspond to any one of the notification modes. When a current time belongs to any one of the predetermined time sections, the setting of the notification mode may include setting the notification mode to be an application notification mode corresponding to the predetermined time section.

The notification method may further include setting the notification mode to be the basic notification mode when the current time does not belong to any one of the predetermined time sections.

According to still another aspect of the present invention, there is provided a mobile terminal in which an application using a plurality of notification modes is installed, the mobile terminal including a notification unit including a plurality of notification devices corresponding to the notification modes, an interface unit to receive, from a user, a predetermined time section and an application notification mode corresponding to the predetermined time section to provide a notification associated with the application using any one of the notification modes during the predetermined time section, a storage unit in which the predetermined time section and the application notification mode are stored, and a controller to change a notification mode of the application based on a basic notification mode and the application notification mode when the predetermined time section starts, and re-change the notification mode of the application based on the basic notification mode when the predetermined time section ends.

The interface unit may include a first interface to which a start point and an end point of the predetermined time section are input and a second interface to which any one of the notification modes is input. The controller may generate the predetermined time section based on the input start point and the input end point, generate the application notification mode by matching the input notification mode to the predetermined time section, and store the predetermined time section and the application notification mode in the storage unit.

The interface unit may further include a third interface to which at least one day of a week on which the predetermined time section is repetitively activated is input. The controller may generate the predetermined time section based on the input day of the week.

The interface unit may further include a fourth interface to which a command as to whether to activate the application notification mode is input. The controller may determine whether to provide the first interface and the second interface to the user based on whether the application notification mode is to be activated.

The interface unit may include a first interface to which a start point of the predetermined time section is input, a second interface to which a duration of the predetermined time section is input, and a third interface to which any one of the notification modes is input. The controller may generate the predetermined time section based on the input start point and the input duration, generate the application notification mode by matching the input notification mode to the predetermined time section, and store the predetermined time section and the application notification mode in the storage unit.

The first interface may include an interface to set the start point as a current time.

The interface unit may further include an interface to display a remaining period of the duration of the predetermined time section.

BEST MODE FOR CARRYING OUT THE INVENTION

Figure 1:
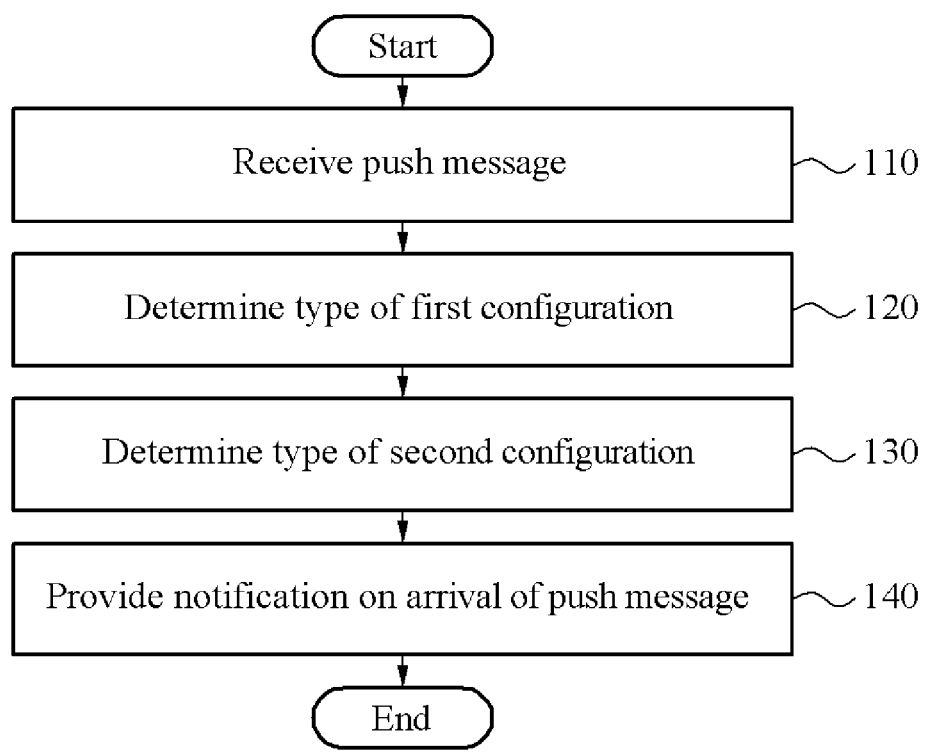
FIGS. 1 and 2 are flowcharts illustrating a notification method of a mobile terminal to determine a type of a second configuration based on a type of a first configuration according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
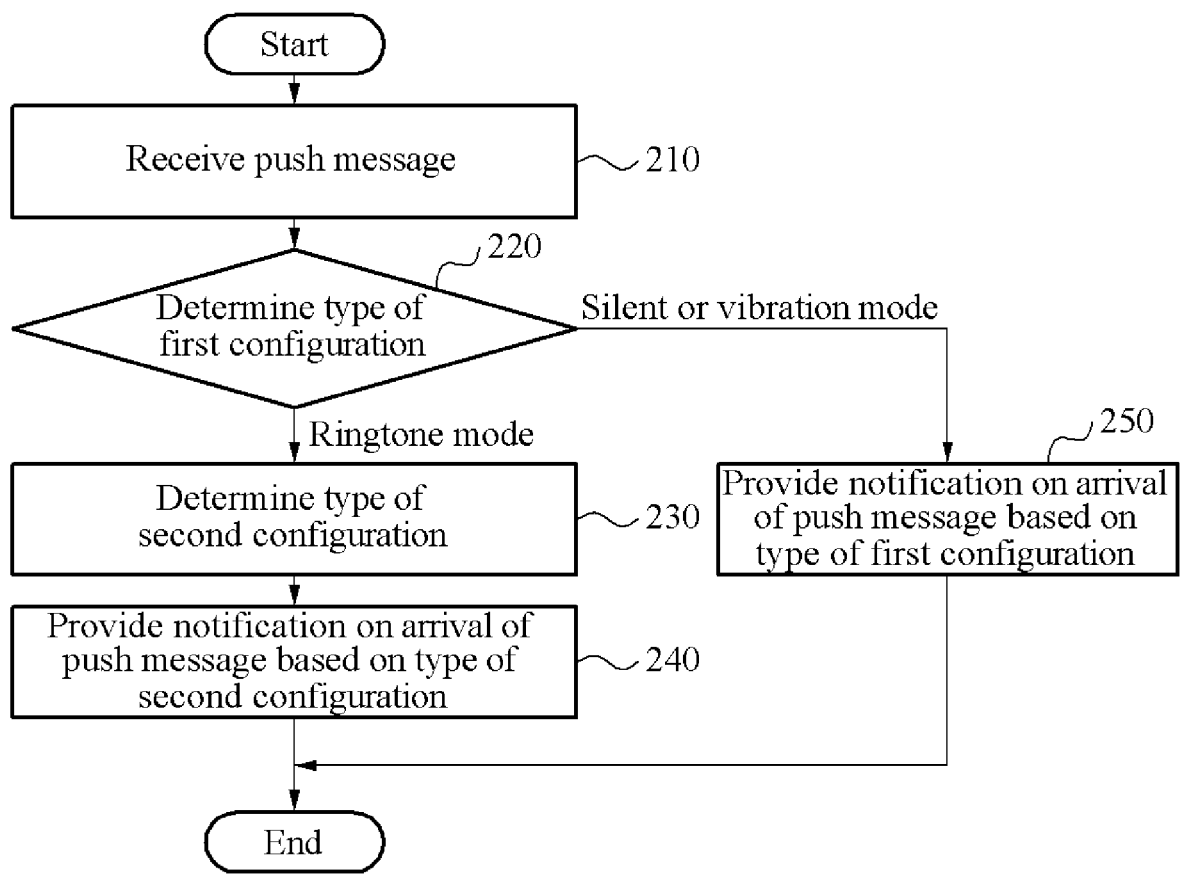

FIGS. 1 and 2 are flowcharts illustrating a notification method of a mobile terminal to determine a type of a second configuration based on a type of a first configuration according to an embodiment of the present invention.

Referring to FIG. 1, in operation 110, the mobile terminal receives a new push message from a server using an application. For example, the mobile terminal may receive a new push message transmitted from a push server using, for example, an instant message application or a social networking service (SNS) application.

The application may include all applications receiving a push notification from a server. In such a case, an instant message server or an SNS server may provide notification on a presence of a new instant message or a new SNS message to the push server. The push server may then transmit, to the mobile terminal, a push message providing notification on the presence of the new instant message or the new SNS message.

In operation 120, the mobile terminal determines the type of the first configuration in response to reception of the new push message. The first configuration may include information associated with a notification mode of the mobile terminal. For example, the first configuration may include information indicating that the notification mode of the mobile terminal is any one of a ringtone mode, a vibration mode, a silent mode, and a notification-off mode.

In operation 130, the mobile terminal determines the type of the second configuration based on the type of the first configuration. In detail, the mobile terminal determines whether to determine the type of the second configuration based on the type of the first configuration. For example, the mobile terminal may determine the type of the second terminal only when the type of the first configuration is the ringtone mode. Here, the second configuration may include information associated with a notification mode of the application. In detail, the second configuration may include information indicating that the notification mode of the application is any one of a ringtone mode, a vibration mode, a silent mode, and a notification-off mode, irrespective of the information associated with the notification mode of the mobile terminal and included in the first configuration.

In operation 140, the mobile terminal provides notification on an arrival of the new push message based on the type of the second configuration.

According to an embodiment, the mobile terminal may use at least two configurations associated with the notification modes. Here, the mobile terminal may preferentially follow the type of the first configuration with a higher priority based on a predetermined priority order, for example, the first configuration having a priority over the second configuration. For example, when the type of the first configuration corresponds to a predetermined type, for example, the ringtone mode, the mobile terminal may provide notification on the arrival of the new push message based on the type of the second configuration with a lower priority.

Here, the first configuration may be a notification mode set by the user through an environment configuration interface fundamentally provided by the mobile terminal. The second configuration may a notification mode set by the user through an interface separately provided by an application installed in the mobile terminal.

The ringtone mode may include at least two types of the ringtone mode, and the vibration mode may also include at least two types of the vibration mode. The silent mode may refer to a mode in which a notification function is performed without generating a sound or vibration, and include a mode in which a light-emitting diode (LED) lamp blinks, a mode in which a message is displayed on a display without an alert sound or vibration, and the like. The notification-off mode may be a mode in which the notification function is not performed despite reception of a new push message.

Referring to FIG. 2, in operation 210, a mobile terminal receives a new push message from a server using an application. In operation 220, the mobile terminal determines a type of a first configuration in response to reception of the new push message.

As described with reference to FIG. 1, the first configuration may have a higher priority over a second configuration. In operation 220, the mobile terminal determines a type of the second configuration with a lower priority based on a determination that the type of the first configuration is a ringtone mode. In operation 240, the mobile terminal provides notification on an arrival of the new push message based on the type of the second configuration.

In operation 250, when the type of the first configuration is another mode aside from the ringtone mode, for example, a vibration mode and a silent mode, the mobile terminal provides notification on the arrival of the new push message based on the first configuration, irrespective of the type of the second configuration.

Although not illustrated in FIG. 2, when the type of the first configuration is a notification-off mode, the mobile terminal may not perform a function of providing notification on the arrival of the new push message in accordance with the notification-off mode.

Figure 3:
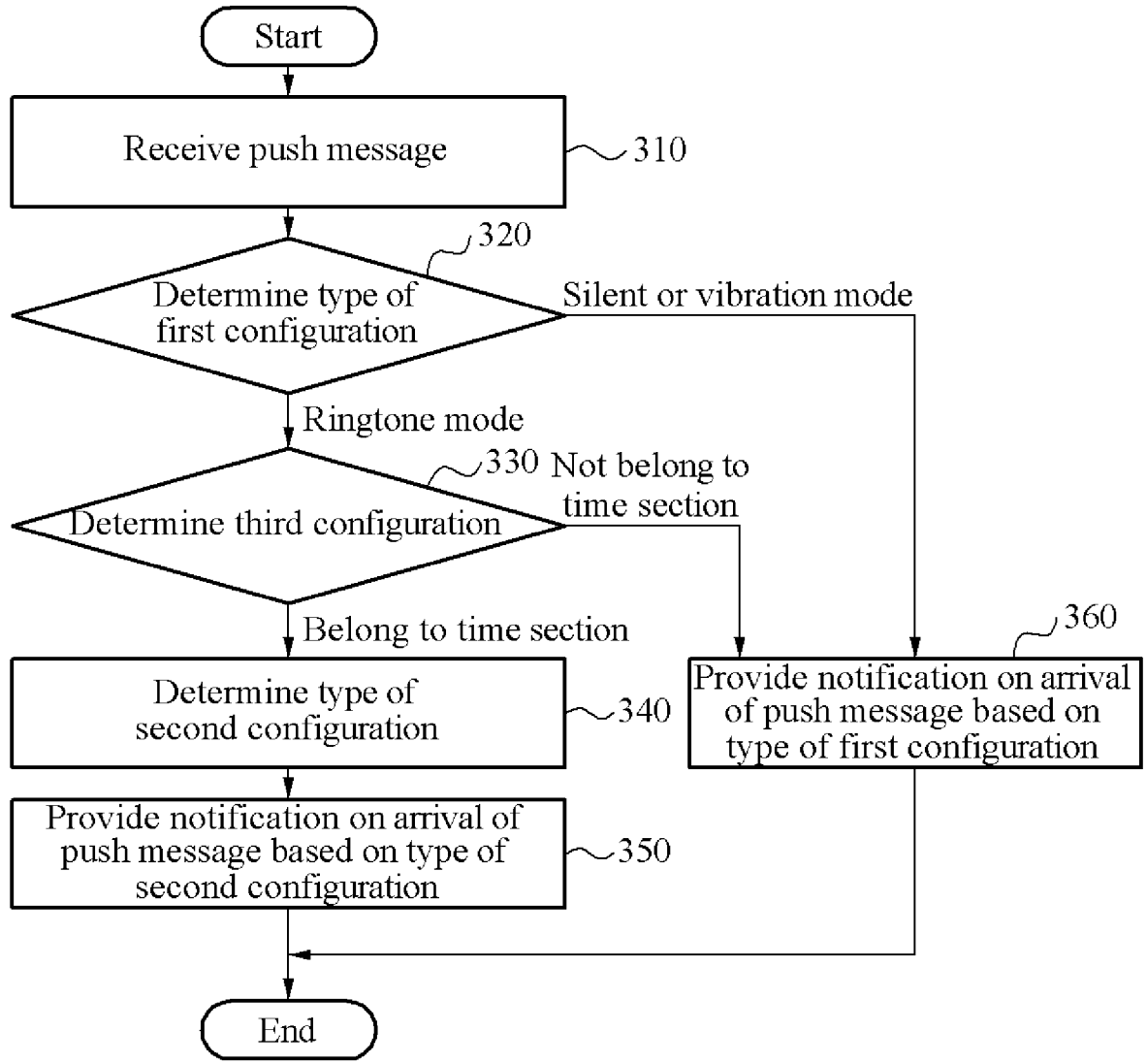
FIG. 3 is a flowchart illustrating a notification method of a mobile terminal to determine a type of a second configuration based on a type of a first configuration and a result of determining a third configuration according to an embodiment of the present invention.

FIG. 3 is a flowchart illustrating a notification method of a mobile terminal to determine a type of a second configuration based on a type of a first configuration and a result of determining a third configuration according to an embodiment of the present invention.

Referring to FIG. 3, in operation 310, the mobile terminal receives a new push message from a server using an application. In operation 320, the mobile terminal determines the type of the first configuration in response to reception of the new push message.

In operation 360, when the type of the first configuration is another mode aside from a ringtone mode, for example, a vibration mode and a silent mode, the mobile terminal provides notification on an arrival of the new push message based on the first configuration irrespective of the type of the second configuration. Although not illustrated in FIG. 3, when the type of the first configuration is a notification-off mode, the mobile terminal may not perform a function of providing notification on the arrival of the new push message in accordance with the notification-off mode.

In operation 330, the mobile terminal determines the third configuration based on the type of the first configuration. For example, when the type of the first configuration is the ringtone mode, the mobile terminal may determine the third configuration.

Here, the third configuration may include information associated with a predetermined time section. According to an embodiment, the third configuration may include information associated with a time section in which the second configuration with a lower priority is used. For example, the third configuration may be the time section set by a user through an interface separately provided in an application installed in the mobile terminal.

The mobile terminal may determine whether a current time belongs to the time section included in the third configuration. In operation 360, when the current time does not belong to the time section included in the third configuration, the mobile terminal provides notification on the arrival of the new push message based on the first configuration irrespective of the type of the second configuration.

Conversely, when the current time belongs to the time section included in the third configuration, the mobile terminal determines the type of the second configuration in operation 340, and provides notification on the arrival of the new push message based on the type of the second configuration in operation 350.

As described in the foregoing, when the type of the first configuration is a predetermined type, for example, the ringtone mode, and the current time belongs to the time section included in the third configuration, the mobile terminal may provide notification on the arrival of the new push message based on the type of the second configuration.

Based on the foregoing description, a series of operations performed by the mobile terminal to provide notification on reception of a new push message may be easily applicable to various cases, for example, reception of a new text message, a new voice call, r a new video call, and new multimedia data.

Figure 4:
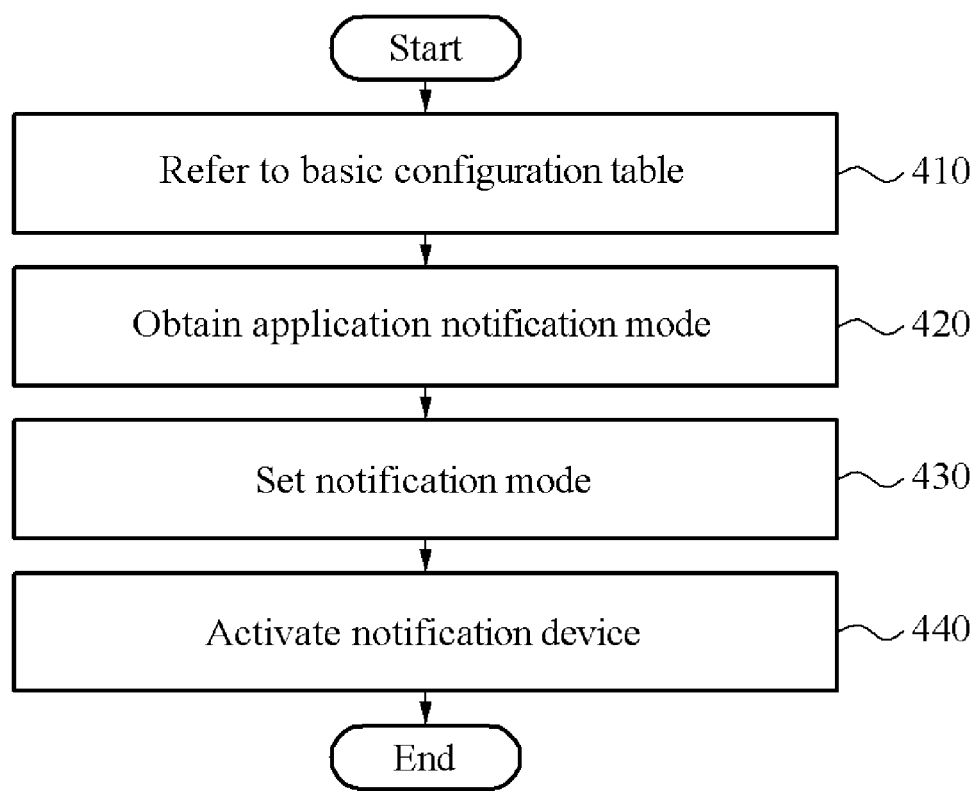
FIGS. 4 and 5A are flowcharts illustrating a notification method of a portable terminal to set a basic notification mode or a notification mode based on a plurality of preset time sections according to an embodiment of the present invention.
Figure 5A:
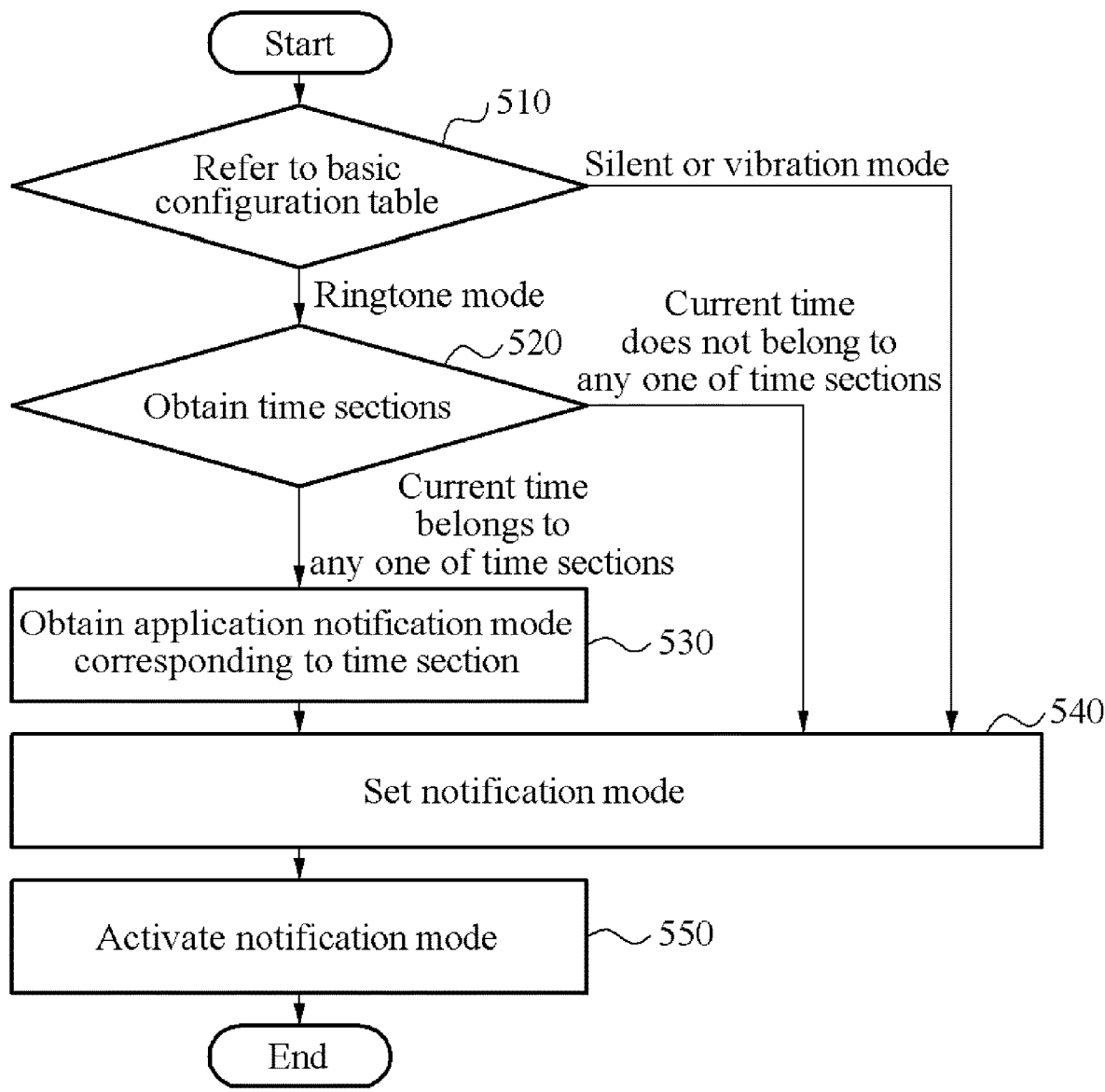

FIGS. 4 and 5A are flowcharts illustrating a notification method of a portable terminal to set a basic notification mode or notification modes based on preset time sections according to an embodiment of the present invention.

Referring to FIG. 4, in operation 410, the portable terminal refers to a basic configuration table. The basic configuration table may be a table including a configuration associated with a notification mode of the portable terminal, for example, the basic notification mode. The basic notification mode may be a notification mode configuration with a highest priority among the notification modes used in the portable terminal.

In operation 420, the portable terminal obtains an application notification mode from an application configuration table based on the basic notification mode. Here, the application configuration table may be a table including a configuration associated with a notification mode of an application installed in the portable terminal. The application notification mode may be a notification mode configuration used for the application to provide notification on an arrival of a new message, and have a lower priority than the basic notification mode.

According to another embodiment, the portable terminal may utilize a plurality of application configuration tables corresponding to a plurality of applications providing a notification function. For example, when a first application is used to provide notification on an arrival of a new message, an application configuration table corresponding to the first application may be used. Similarly, when a second application is used to provide notification on an arrival of a new push message, an application configuration table corresponding to the second application may be used. Here, an application notification mode included in each of the application configuration tables may have a lower priority compared to the basic notification mode.

The basic notification mode and the application notification mode may include at least one of at least one ringtone mode, at least one vibration mode, a silent mode, and a notification-off mode.

In an example, when the basic notification mode is determined to be the ringtone mode as a result of referring to the basic configuration table, the portable terminal may obtain the application notification mode from the application configuration table.

The portable terminal may use a notification mode set as any one of the notification modes provided in the portable terminal, for example, the ringtone mode, the vibration mode, the silent mode, and the notification-off mode. Here, the notification mode may be a flag indicating any one of the notification modes, which is a value to be stored in a predetermined position of a storage device, for example, a dynamic random-access memory (DRAM) and a flash memory.

In operation 430, when the basic notification mode is the ringtone mode as a result of referring to the basic configuration table, the portable terminal sets a notification mode as the application notification mode obtained from the application configuration table.

When a notification function is required to be activated in response to reception of a new call, a new text message, or a new push message, the portable terminal may use the notification mode to activate the notification function. In operation 440, the portable terminal activates the notification function by activating a notification device corresponding to a value set as the notification mode.

Referring to FIG. 5A, in operation 510, a portable terminal refers to a basic configuration table to verify a basic notification mode. In operations 510 and 540, when the basic notification mode is a silent mode or a vibration mode, the portable terminal sets a notification mode as the basic notification mode irrespective of an application notification mode. Although not illustrated in FIG. 5A, when the basic notification mode is a notification-off mode, the portable terminal may set the notification mode as the basic notification mode irrespective of the application notification mode.

In operation 520, when the basic notification mode is a ringtone mode, the portable terminal obtains a plurality of predetermined time sections from an application configuration table. The predetermined time sections may include information associated with time sections in which the application notification mode is to be used in lieu of the basic notification mode. Further, each of the predetermined time sections may correspond to an application notification mode corresponding to any one of the notification modes provided in the portable terminal.

For example, the predetermined time sections may be set by a user through an interface separately provided from an application installed in the portable terminal. Here, the user may set an application notification mode corresponding to a time section. A user interface used for generating such an application configuration table will be further described with reference to FIGS. 7 through 10B.

In an example, the portable terminal may determine whether a current time is included in any one of the obtained time sections. In operations 520 and 540, when the current time does not belong to any one of the time sections, the portable terminal sets the notification mode to be the basic notification mode irrespective of the application notification mode.

However, in operation 530, when the current time is included in any one of the time sections, the portable terminal obtains an application notification mode corresponding to the time section. In operations 530 and 540, the portable terminal sets the notification mode to be the obtained application notification mode.

In operation 550, the portable terminal activates the notification function by activating the notification device corresponding to a value set as the notification mode.

Figure 5B:
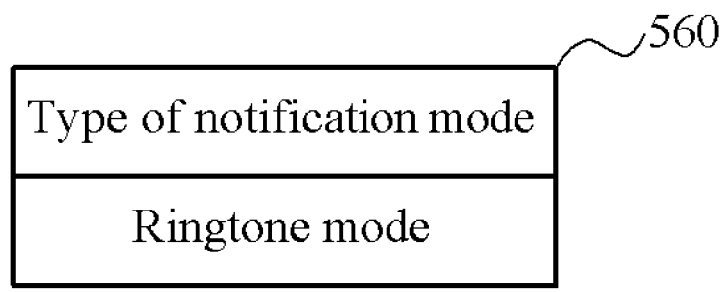
FIGS. 5B and 5C are diagrams illustrating a basic configuration table and an application configuration table, respectively, according to an embodiment of the present invention.
Figure 5C:
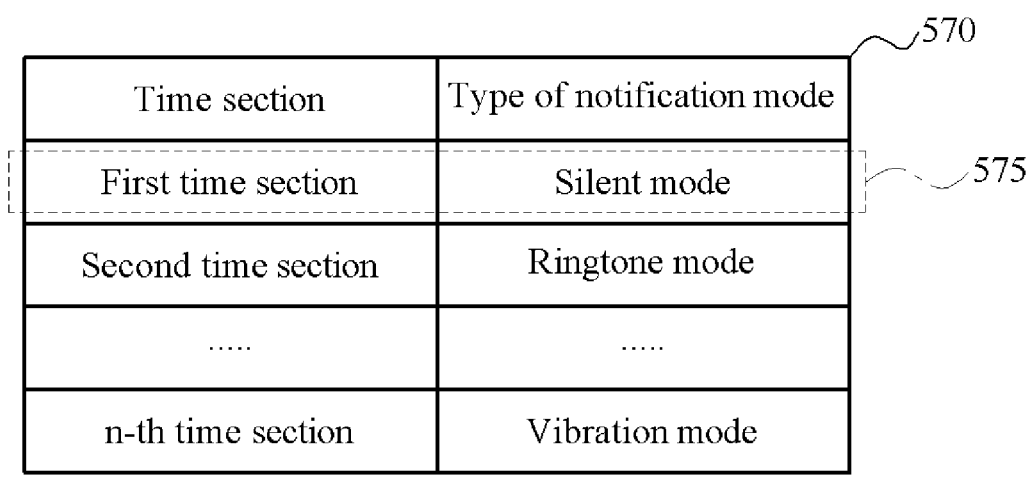

FIGS. 5B and 5C are diagrams illustrating a basic configuration table 560 and an application configuration table 570, respectively, according to an embodiment of the present invention.

Referring to FIG. 5B, the basic configuration table 560 includes information indicating that a basic notification mode is a ringtone mode. As described in the foregoing, when the basic notification mode is the ringtone mode, a portable terminal may use an application notification mode with a lower priority than the basic notification mode.

Referring to FIG. 5C, the application configuration table 570 includes n time sections and a type of a notification mode corresponding to each of the n time sections. For example, the application configuration table 570 may include information 575 indicating that a type of a notification mode corresponding to a first time section is a silent mode. Here, the first time section is a time section in which a start point and an end point are set. For example, the first time section may be a time section spanning from 2:00 p.m.

to 5:30 p.m. Also, the first time section may be a time section that is periodically repeated, for example, every Sunday and all day long.

Referring back to FIG. 5A, when the portable terminal verifies that the basic notification mode is a ringtone mode by referring to the basic configuration table 560 in operation 510, the portable terminal obtains the predetermined time sections from the application configuration table 570 in operation 520. Here, the portable terminal may determine whether a current time belongs to any one of the obtained time sections. When the current time belongs to the first time section, the portable terminal obtains, from the application configuration table 570, the information 575 indicating that a type of the notification mode corresponding to the first time section is a silent mode in operation 530. The portable terminal then sets the notification mode as the silent mode in operation 540, and activates a notification device corresponding to a value set as the notification mode in operation 550.

As described in the foregoing, the portable terminal may set a notification mode using two tables. Here, the two tables may have different priorities from each other, and the portable terminal may set the notification mode by first referring to the basic configuration table 560 with a higher priority. Further, when a basic notification mode stored in the basic configuration table 560 with the higher priority is a predetermined notification mode, for example, a ringtone mode, the portable terminal may set the notification mode by referring to the application configuration table 570 with a lower priority.

Also, the portable terminal may perform operations 510 through 540 by interworking with various cases. In an example, when a notification function is required to be activated in response to reception of a new call or a new message, the portable terminal may perform operations 510 through 540. In another example, the portable terminal may perform operations 510 through 540 every predetermined cycle, for example, at 1 minute intervals. In still another example, when details of the basic configuration table 560 or the application configuration table 570 are changed, the portable terminal may perform operations 510 through 540.

Figure 6:
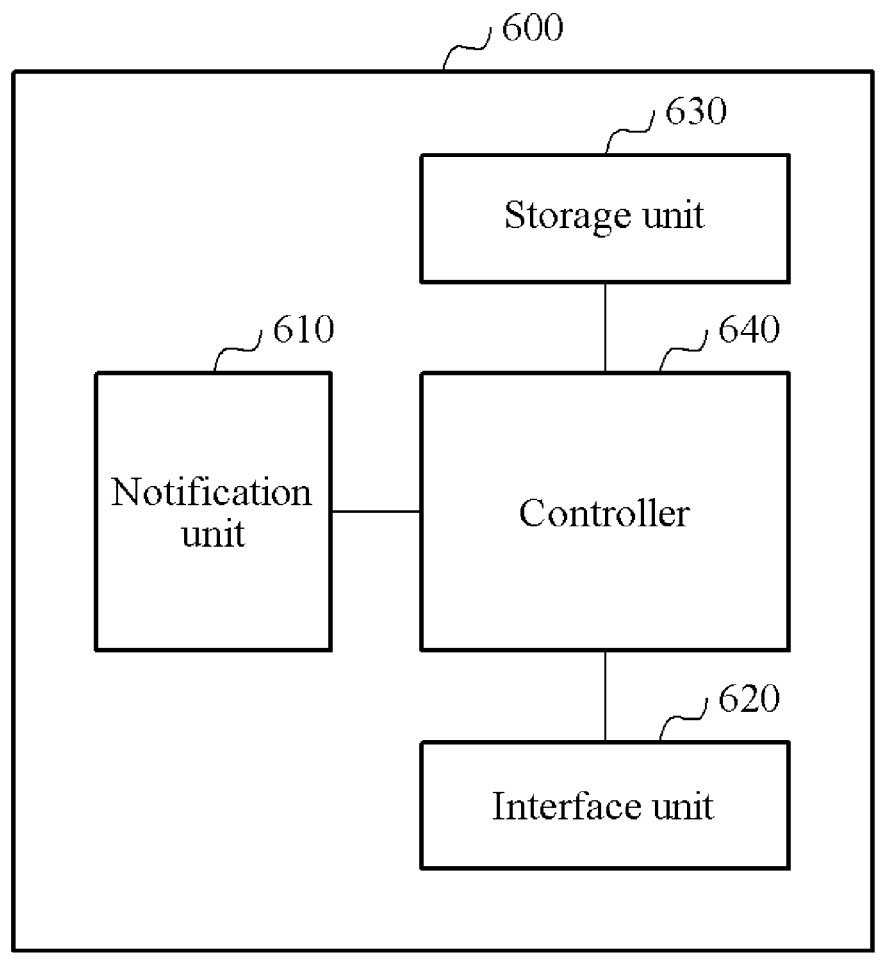
FIG. 6 is a block diagram illustrating a mobile terminal including an interface unit to which an application notification mode is input according to an embodiment of the present invention.

FIG. 6 is a diagram illustrating a mobile terminal 600 including an interface unit 620 to which an application notification mode is input according to an embodiment of the present invention.

Referring to FIG. 6, the mobile terminal 600 includes a notification unit 610, the interface unit 620, a storage unit 630, and a controller 640.

The notification unit 610 includes a plurality of notification devices provided in the mobile terminal 600 and corresponding to a plurality of notification modes. The notification modes may include at least one of a ringtone mode, a vibration mode, and a silent mode.

The interface unit 620 receives, from a user, a predetermined time section and an application notification mode corresponding to the predetermined time section to provide notification associated with an application using any one of the notification modes during the predetermined time section.

The controller 640 generates the predetermined time section and the application notification mode corresponding to the predetermined time section based on inputs from the user through the interface unit 620. The controller 640 stores the generated time section and the generated application notification mode in the storage unit 630.

Detailed descriptions of interworking between the interface unit 620 and the controller 640 will be provided with reference to FIGS. 7 through 10B.

The controller 640 determines whether a time section is started using the predetermined time section stored in the storage unit 630. When the predetermined time section is started, the controller 640 may change an application notification mode based on the basic notification mode and the application notification mode stored in the storage unit 630.

In addition, the controller 640 determines whether the time section is terminated using the predetermined time section stored in the storage unit 630. When the predetermined time section is terminated, the controller 640 may re-change the application notification mode based on the basic notification mode stored in the storage unit 630.

Descriptions provided with reference to FIGS. 1 through 5 may be applicable to each module illustrated in FIG. 6 and thus, repeated descriptions will be omitted here for brevity.

FIGS. 7 through 10B are diagrams illustrating an interface used to receive, from a user, a time section and an application notification mode corresponding to the time section according to an embodiment of the present invention.

Figure 7:
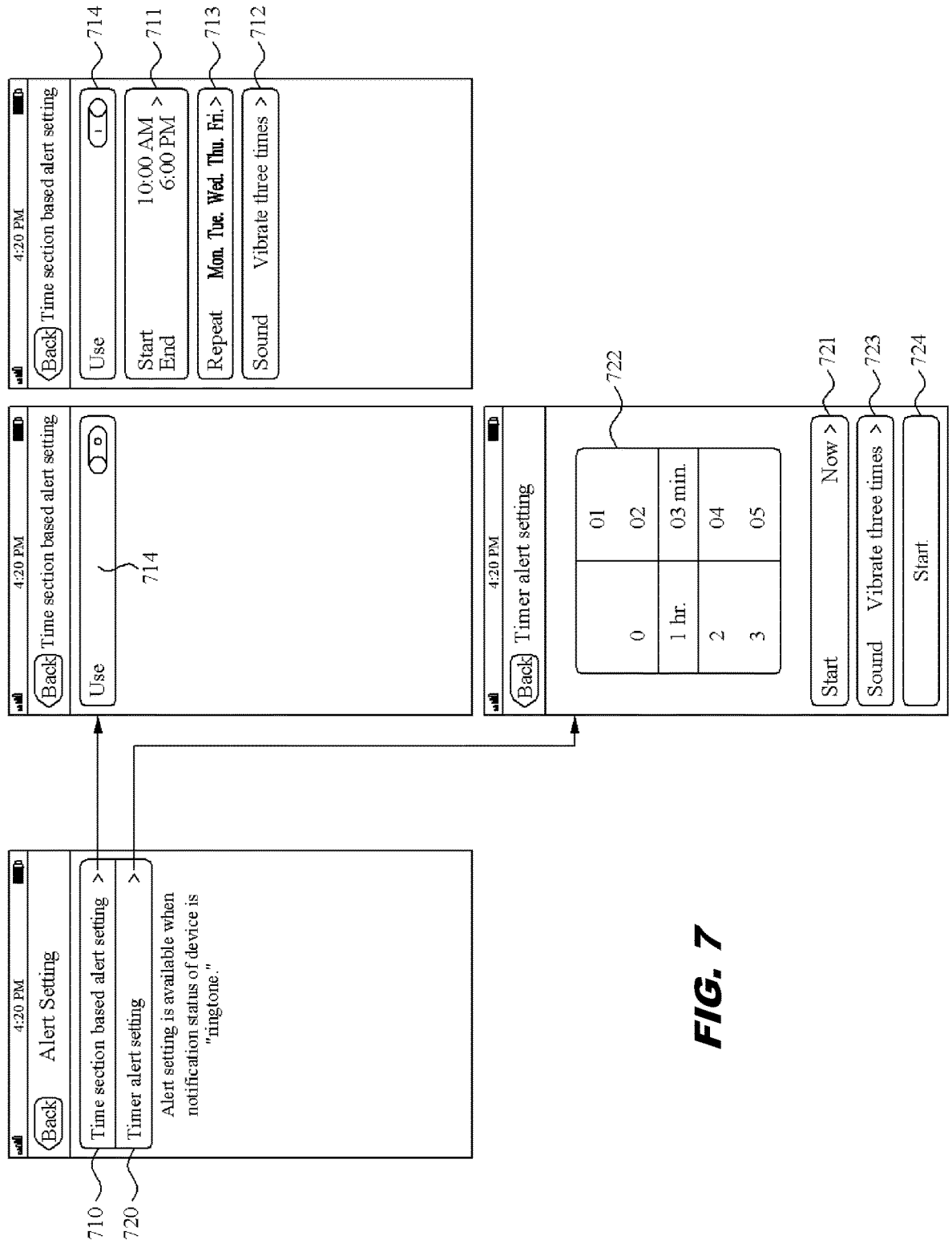
FIGS. 7 through 10B are diagrams illustrating an interface used to receive, from a user, a time section and an application notification mode corresponding to the time section according to an embodiment of the present invention.

Referring to FIG. 7, an interface unit receives, from the user, a predetermined time section and an application notification mode corresponding to the predetermined time section to provide notification associated with an application using any one of notification modes during the predetermined time section.

Here, the interface unit may provide a plurality of notification configuration interfaces to which the predetermined time section and the application notification mode corresponding to the predetermined time section are input.

For example, the interface unit may provide a time section based alert setting interface 710 and a timer alert setting interface 720.

When the user selects the time section based alert setting interface 710, the interface unit may provide an interface 714 to which a command as to whether to activate the application notification mode is input.

Here, a controller may determine whether to provide an interface 711, an interface 712, and an interface 713 to the user based on whether the application notification mode is to be activated.

When the user activates the application notification mode using the interface 714, the interface unit may provide the interface 711 to which a start point and an end point of the predetermined time section are input and the interface 712 to which any one of the notification modes is input. In addition, the interface unit may provide the interface 713 to which at least one day of a week on which the predetermined time section is to be repeated is input.

Figure 8A:
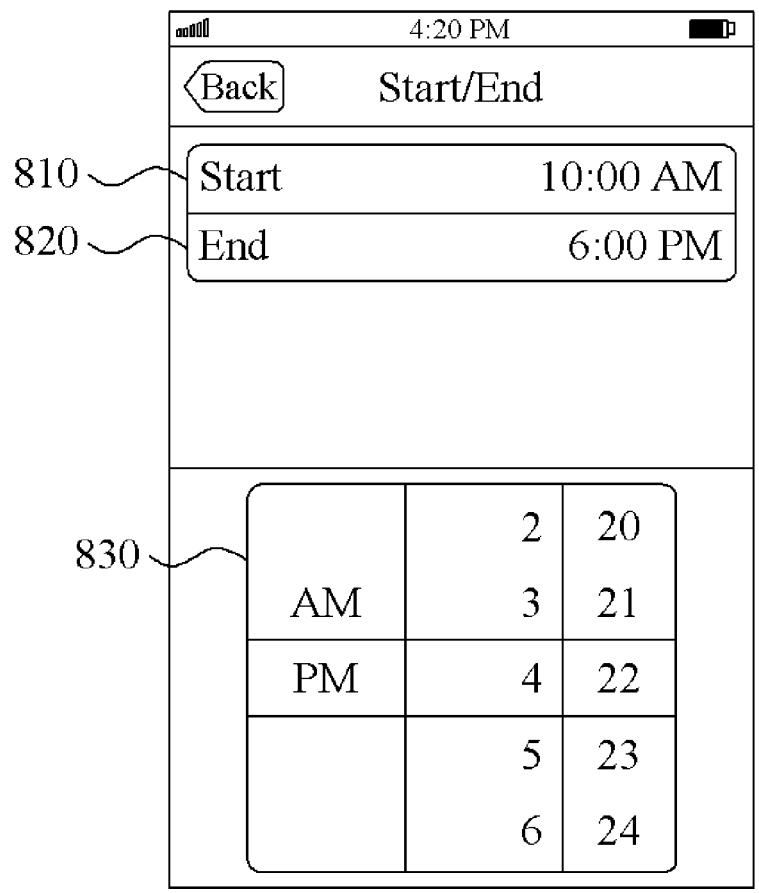

Referring to FIG. 8A, when the user selects the interface 711, the interface unit may provide an interface 810 to which a start point of the predetermined time section is input and an interface 820 to which an end point of the predetermined time section is input.

In addition, the interface unit may provide an interface 830 to which detailed time information is input by interworking with each of the interface 810 and the interface 820. The interface 830 may include an interface to which a.m./p.m., hours, and minutes are input.

Figure 8B:
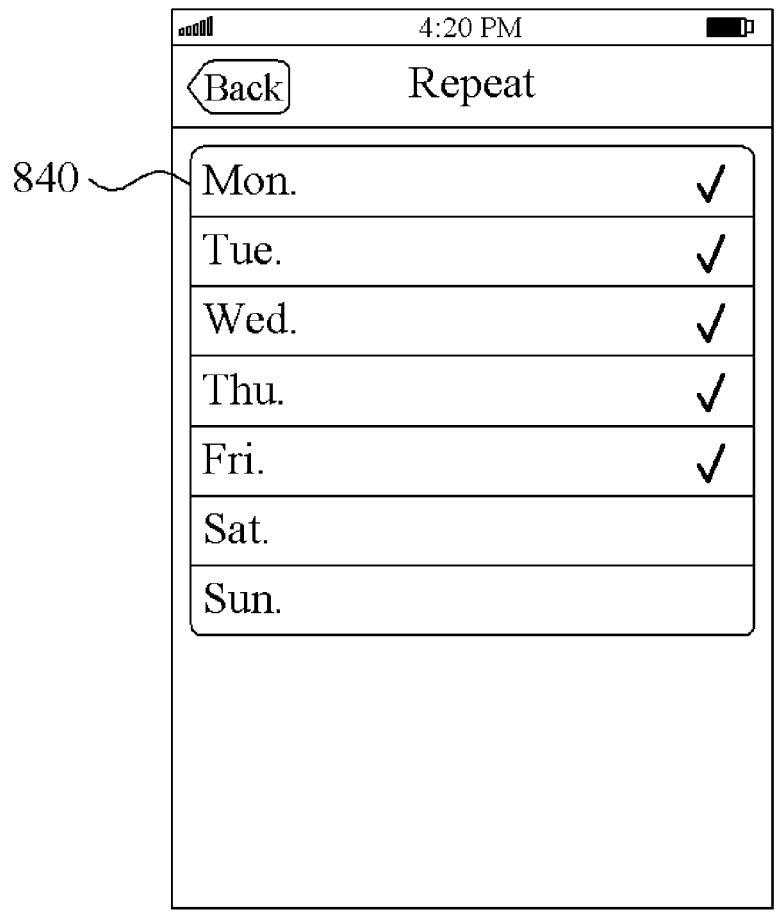

Referring to FIG. 8B, when the user selects the interface 713, the interface unit may provide an interface 840 to which at least one day of a week on which the predetermined time section is to be repeated is input. The interface 840 may include an interface through which the user may select the day from Monday through Sunday. In detail, the user may select at least one day of the week on which the predetermined time section is repetitively activated. The interface 840 may display a check mark on the selected day.

Figure 8C:
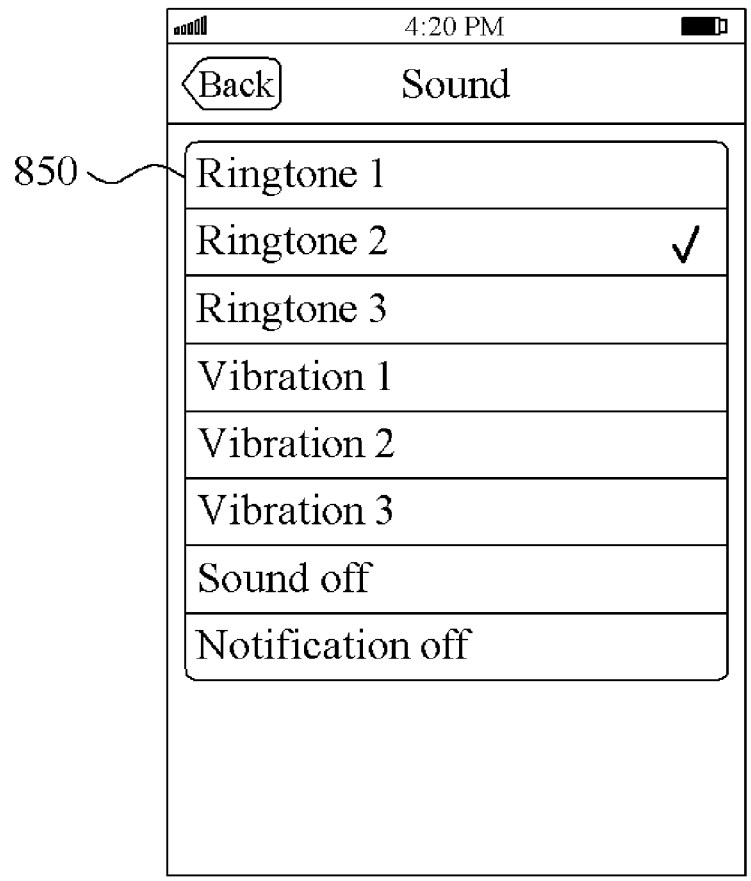

Referring to FIG. 8C, when the user selects the interface 712, the interface unit may provide an interface 850 to which at least one of the notification modes is input. The interface 850 may include an interface through which the user selects at least one of ringtone modes, vibration modes, a silent mode, and a notification-off mode. Here, the user may select any one of the notification modes, and the interface 850 may display a check mark on the selected notification mode.

It may be obvious to those skilled in the art that various modifications may be made to the foregoing interfaces.

The controller may generate the predetermined time section based on the start point and the end point input through the interface 711. The controller may generate the predetermined time section based on the at least one day of the week input through the interface 713. The controller may generate the application notification mode by matching the notification mode input through the interface 712 to the predetermined time section. In addition, the controller may store the generated predetermined time section and the generated application notification mode in the storage unit.

Also, when the user selects the timer alert setting interface 720, the interface unit may provide an interface 721, an interface 722, and an interface 723.

The interface 721 may receive a start point of the predetermined time section. The interface 722 may receive a duration of the predetermined time section. The interface 723 may receive any one of the notification modes. Here, the interface 722 may include an interface to which the duration is input in a unit of hours and minutes.

In addition, the interface unit may further provide an interface 724 to which a command as to whether to activate a timer mode is input.

When the user selects the interface 723, the interface unit may provide the interface 850 described with reference to FIG. 8C.

Figure 9A:
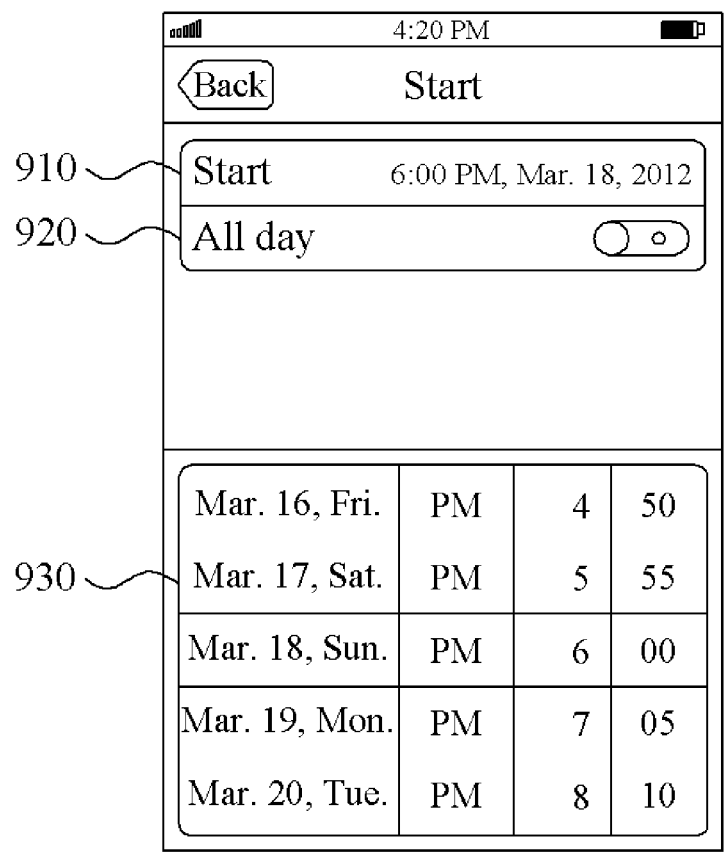

Referring to FIG. 9A, when the user selects the interface 721, the interface unit may provide an interface 910 to which a start point of the predetermined time section is input. The interface unit may provide an interface 930 to which detailed time information is input by interworking with the interface 910. For example, the interface 930 may include an interface to which a date, a.m./p.m., hours, and minutes are input. For another example, the interface 930 may include an interface through which a current time is to be set as the start point of the predetermined time section.

Also, the interface unit may additionally provide an interface 920 through which an all day mode is activated.

Figure 9B:
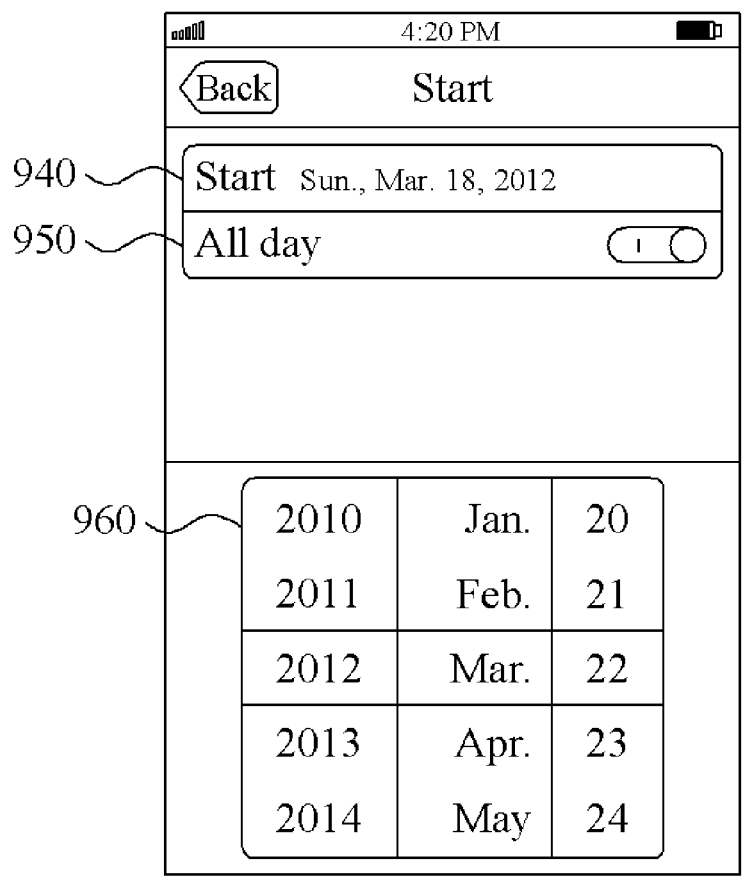

Referring to FIG. 9B, when the user activates the all day mode using the interface 920, an interface 950 may display information indicating that the all day mode is activated. Here, an interface 960 interworking with the interface 940 may include an interface to which a date is input.

It may be obvious to those skilled in the art that various modifications may be made to the foregoing interfaces.

The controller may generate the predetermined time section based on the start point input through the interface 721 and the duration input through the interface 722. The controller may generate the application notification mode by matching the notification mode input through the interface 723 to the predetermined time section. In addition, the controller may store, in the storage unit, the generated predetermined time section and the generated application notification mode.

Figure 10A:
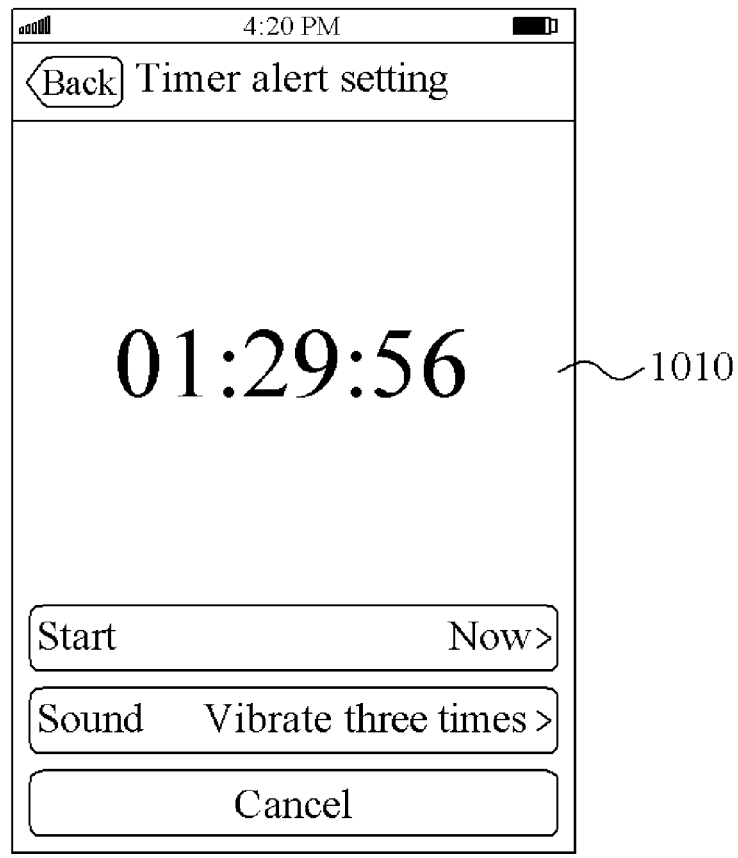

Referring to FIG. 10A, when the timer mode is activated through the interface 724, the interface unit may provide an interface 1010 displaying a remaining period of the duration of the predetermined time section. The interface 1010 may display the remaining period in a unit of hour, minute, and second.

Figure 10B:
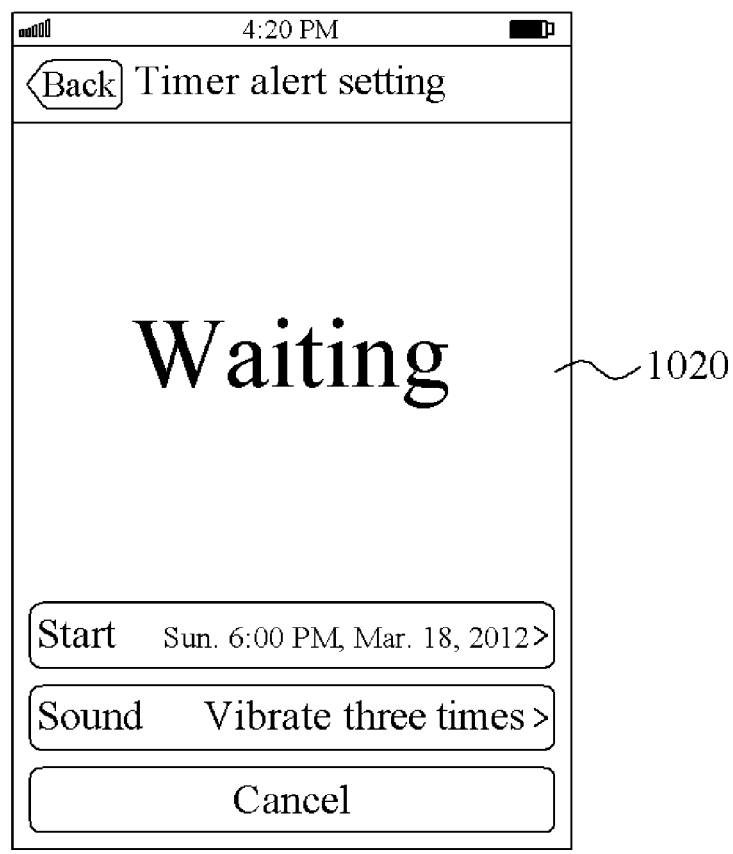

Referring to FIG. 10B, when the timer mode is activated through the interface 724, the interface unit may provide an interface 1020 displaying information that the predetermined time section is not started yet.

It may be obvious to those skilled in the art that various modifications may be made to the foregoing interfaces.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A notification method of a mobile terminal using a plurality of notification modes, the notification method comprising:

receiving, at the mobile terminal, a new push message from a server, the new push message directed to an application from among a plurality of applications installed in the mobile terminal;

in response to reception of the new push message, determining a first configured notification mode of the mobile terminal, the first configured notification mode configured to control notifications of each of the plurality of applications installed at the mobile terminal;

determining a second configured notification mode configured at the mobile terminal, the second configured notification mode being specific to the application and configured to control notifications of the application, the second configured notification mode being a vibrate mode, a silent mode, or a notification-off mode; and providing a notification on an arrival of the new push message, based on the determinations of the first configured notification mode and the second configured notification mode, wherein the providing the notification on the arrival of the new push message comprises operating the mobile terminal to provide the notification, the mobile terminal configured to, in response to determining that the first configured notification mode is a ringtone mode:

obtain one or more predetermined time sections associated with the second configured notification mode, the one or more predetermined time sections being configured via one or more interfaces provided by the application, and provide the notification on the arrival of the new push message using a particular time section from among the one or more predetermined time sections associated with the second configured notification mode, the particular time section being inclusive of a time at which the new push message was received at the mobile terminal.

2. A notification method of a mobile terminal using a notification mode among a plurality of notification modes, the notification method being performed in response to reception of a new push message at the mobile terminal, and the method comprising:

determining a configured basic notification mode of the mobile terminal, the configured basic notification mode configured to control notifications of each of a plurality of applications installed at the mobile terminal;

determining a configured application notification mode of an application from among the plurality of applications installed in the mobile terminal, the new push message being directed to the application, and the configured application notification mode being specific to the application and configured to control notifications of the application, the configured application notification mode being a vibrate mode, a silent mode, or a notification-off mode; and setting the notification mode of the mobile terminal as the configured basic notification mode or the configured application notification mode, wherein setting the notification mode comprises operating the mobile terminal, the mobile terminal configured to, in response to determining that the configured basic notification mode is a ringtone mode;

obtain one or more predetermined time sections associated with the configured application notification mode, the one or more predetermined time sections being configured via one or more interfaces provided by the application, and set the notification mode of the mobile terminal using a particular time section from among the one or more predetermined time sections associated with the configured application notification mode, the particular time section being inclusive of a time at which the new push message was received at the mobile terminal.

* * * * *